(12) United States Patent
Daio

(10) Patent No.: US 7,235,938 B2
(45) Date of Patent: Jun. 26, 2007

(54) MOTOR DRIVE AND MAGNETIC DISC APPARATUS

(75) Inventor: Mitsuaki Daio, Yasu (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/569,239

(22) PCT Filed: Aug. 20, 2004

(86) PCT No.: PCT/JP2004/011973

§ 371 (c)(1),
(2), (4) Date: Feb. 21, 2006

(87) PCT Pub. No.: WO2005/020424

PCT Pub. Date: Mar. 3, 2005

(65) Prior Publication Data

US 2007/0001632 A1 Jan. 4, 2007

(30) Foreign Application Priority Data

Aug. 21, 2003 (JP) ................................ 2003-297858

(51) Int. Cl.
*H02K 21/00* (2006.01)

(52) U.S. Cl. ...................... 318/254; 318/439; 318/138

(58) Field of Classification Search .................... None
See application file for complete search history.

(56) References Cited

U.S. PATENT DOCUMENTS

| | | | | |
|---|---|---|---|---|
| 4,651,067 A | * | 3/1987 | Ito et al. ...................... | 318/254 |
| 5,321,342 A | * | 6/1994 | Kruse ......................... | 318/254 |
| 5,654,840 A | * | 8/1997 | Patton et al. ................. | 360/75 |
| 6,463,211 B1 | | 10/2002 | Peritore et al. | |
| 6,611,118 B2 | * | 8/2003 | Abe et al. .................... | 318/254 |
| 6,864,656 B2 | * | 3/2005 | Abe et al. .................... | 318/560 |

* cited by examiner

*Primary Examiner*—Lincoln Donovan
*Assistant Examiner*—Renata McCloud
(74) *Attorney, Agent, or Firm*—Fish & Richardson P.C.

(57) ABSTRACT

A back electromotive force detection circuit 12 incorporates an A/D conversion circuit 14 that converts the output from a differential amplifier circuit A2 into a digital signal and an offset calculation circuit 15 that sets the resistance value of a variable resistor R2 according to the output from the A/D conversion circuit 14. Based on the difference between the output from the A/D conversion circuit 14 as obtained when the drive current fed to a motor coil L equals zero and the output from the A/D conversion circuit 14 as obtained when the drive current fed to a motor coil L equals a predetermined value, the offset calculation circuit 15 sets the resistance value of the variable resistor R2.

10 Claims, 3 Drawing Sheets

MOTOR DRIVE AND MAGNETIC DISC APPARATUS

TECHNICAL FIELD

The present invention relates to a motor driver that drives a direct-current motor, and more particularly to a motor driver that monitors a current flowing through a motor coil to correct an offset voltage in an input voltage. The present invention also relates to a magnetic disk apparatus in which a magnetic head is driven and controlled with such a motor driver.

BACKGROUND ART

A motor driver that drives and controls a direct-current motor, such as a VCM (voice coil motor) used to produce a mechanical force for moving a magnetic head in a hard disk drive, controls the speed of the direct-current motor by controlling the current value of the drive current fed to the motor coil provided in the direct-current motor. As a conventional technique, there has been proposed a speed control circuit for a direct-current motor wherein the back electromotive force that appears when the motor coil of the direct-current motor is driven is detected based on the current value of the current that flows through voltage division resistors, and, according to the back electromotive force thus detected, the speed of the direct-current motor is controlled (see Patent Publication 1 listed below).

In this speed control circuit, the resistance value of one of the voltage division resistors is changed so that the rotation speed is changed stepwise. Moreover, as the rotation speed of the direct-current motor is changed, the torque characteristic thereof against load changes accordingly. To suppress this change in the torque against load, the resistance value of a resistor connected in parallel with the direct-current motor between the voltage division resistors and the supply voltage is changed.

In a motor driver that controls the speed of a direct-current motor as described above, there is provided a back electromotive force detection circuit configured as shown in FIG. 7. This circuit includes: a resistor Rs of which one end is connected to one end of the motor coil L of the direct-current motor; a resistor R1 of which one end is connected to the other end of the resistor Rs; a differential amplifier circuit A1 of which the inverting input terminal is connected to the other end of the resistor R1 and of which the non-inverting input terminal is connected to the node between the resistor Rs and the motor coil L; a variable resistor R2 that is connected between the inverting input terminal and the output terminal of the differential amplifier circuit A1; a resistor R3 of which one end is connected to the output terminal of the differential amplifier circuit A1; a resistor R4 of which one end is connected to the other end of the resistor R3 and that receives a direct-current voltage Vref at the other end thereof; a resistor R5 of which one end is connected to the other end of the motor coil L; a differential amplifier circuit A2 whose non-inverting input terminal is connected to the node between the resistors R3 and R4 and whose inverting input terminal is connected to the other end of the resistor R5; and a resistor R6 that is connected to the inverting input terminal and the output terminal of the differential amplifier circuit A2.

Configured as described above, the back electromotive force detection circuit shown in FIG. 7 operates as follows. The differential amplifier circuit A1 outputs a signal containing, as a component thereof, the back electromotive force appearing in the motor coil L. Here, the resistance value of the internal resistance of the motor coil L varies with the ambient temperature of the motor driver, and thus an offset due to the change in the resistance value of the internal resistance of the motor coil L appears in the output of the differential amplifier circuit A2. To cancel this offset due to the change in the resistance value of the internal resistance of the motor coil L, the back electromotive force detection circuit shown in FIG. 7 further includes: a differential amplifier circuit A3 whose non-inverting input terminal is connected to the output terminal of the differential amplifier circuit A2 and that receives, as a reference voltage, a direct-current voltage Voff at the inverting input terminal thereof; and a resistance adjustment counter 100 that performs counting operation according to the output of the differential amplifier circuit A3 so as to change the resistance value of the variable resistor R2 to a resistance value proportional to the counted value.

As a result of the differential amplifier circuit A3 operating as a comparator, the resistance adjustment counter 100 performs counting operation according to the output of the differential amplifier circuit A3 every period of a clock fed in, and adjusts the resistance value of the variable resistor R2 to make it commensurate with the counted value. Here, in a case where the controlled target is a VCM for moving a magnetic head in a hard disk drive, first the magnetic head is kept stationary in contact with a spindle or the inner wall of a ramp area so that no back electromotive force appears, and then the resistance adjustment counter 100 is reset to an initial value. Then, the output from the differential amplifier circuit A2 is compared with the reference voltage Voff by the differential amplifier circuit A3, and, if the output from the differential amplifier circuit A2 is higher, the differential amplifier circuit A3 feeds a logically high output to the resistance adjustment counter 100.

Thus, on receiving a clock pulse, the resistance adjustment counter 100 counts one, and then changes the resistance value of the variable resistor R2 to make it commensurate with the counted value. After the resistance value of the variable resistor R2 is changed in this way, a similar sequence of operations is repeated; specifically, the output from the differential amplifier circuit A2 is compared with the reference voltage Voff and, if they are not equal, the resistance adjustment counter 100 performs counting operation and changes the resistance value of the variable resistor R2. By contrast, if the output from the differential amplifier circuit A2 equals the reference voltage Voff, the differential amplifier circuit A3 outputs a logic low. This makes the resistance adjustment counter 100 stop counting operation, and settles the resistance value of the variable resistor R2.

In this way, the resistance value of the variable resistor R2 is adjusted so that the output from the differential amplifier circuit A2 equals the reference voltage Voff and no offset appears. Thus, the back electromotive force detection circuit shown in FIG. 7 can cancel the offset that appears due to the resistance value of the internal resistance, which varies with temperature, of the motor coil L of the direct-current motor.

Patent Publication 1: Japanese Patent Application Published No. H8-4391

DISCLOSURE OF THE INVENTION

PROBLEMS TO BE SOLVED BY THE INVENTION

With the configuration shown in FIG. 7, the offset that appears due to the resistance value of the internal resistance of the motor coil L of the direct-current motor can be cancelled. However, until the offset is cancelled, the resistance adjustment counter 100 counts one by one and each time adjusts the resistance value to make it proportional to the counted value. Thus, it takes time to adjust the resistance value of the variable resistor R2 until the offset is canceled. Accordingly, a motor driver incorporating a back electromotive force detection circuit like the one shown in FIG. 7 requires a sufficient period to complete initial setting, and thus takes time until it starts to operate. Moreover, the speed control circuit for a direct-current motor disclosed in Patent Publication 1 does not include a mechanism for automatically canceling the offset that appears due to the resistance value, which varies with temperature, of the motor coil L of the direct-current motor.

In view of the inconveniences mentioned above, an object of the present invention is to provide a motor driver that is capable of automatically changing the resistance value of a variable resistor for automatically canceling an offset appearing in response to a change in temperature and that helps simplify this capability of automatically changing the resistance value of the variable resistor, and to provide a magnetic disk apparatus incorporating such a motor driver.

MEANS FOR SOLVING THE PROBLEM

To achieve the above object, according to the present invention, a motor driver is provided with a back electromotive force detection section that detects the back electromotive force appearing in a motor coil of a direct-current motor and outputs a detection signal; and a speed control section that, based on the back electromotive force detected by the back electromotive force detection section, sets and outputs the current value of a drive current fed to the motor coil. Here, the motor driver is further provided with: an offset calculation section that first establishes a state in which the direct-current motor cannot be driven via the motor coil and thus no back electromotive force appears, that then reads, as a first output, the output of the back electromotive force detection section as obtained when the current value of the drive current fed to the motor coil is made equal to zero, that then reads, as a second output, the output of the back electromotive force detection section as obtained when the current value of the drive current fed to the motor coil is made equal to a predetermined value, that then calculates, based on the difference between the first and second outputs, the offset that appears in the output of the back electromotive force detection section as a result of a change in the internal resistance of the motor coil, and that then eliminates the offset by changing the amplification factor of the back electromotive force detection section.

ADVANTAGES OF THE INVENTION

According to the present invention, as a result of the motor driver being provided with the offset calculation section that eliminates an offset by changing the amplification factor of the back electromotive force detection section, it is no longer necessary to externally perform calculation to eliminate an offset, and thus it is possible to reduce the burden on an externally provided control section. Moreover, since an offset due to a temperature-related change in the motor coil can be eliminated, it is possible to control a direct-current motor with high precision regardless of temperature change in the environment where the motor driver is installed. Moreover, the motor driver can be initialized through simple calculation by the offset calculation section, and thus it is possible to reduce the time required for initialization. Furthermore, since the resistance value of the second resistor can be changed by the use of a digital signal from the back electromotive force detection section, it is possible to simplify the calculation performed by the offset calculation section.

LIST OF REFERENCE SYMBOLS

1 Semiconductor Integrated Circuit Device
2 CPU
11 Current Control Circuit
12 Back Electromotive Force Detection Circuit
13 D/A Conversion Circuit
14 A/D conversion Circuit
15 Offset Calculation Circuit
16 Subtraction Circuit
R1, R3–R6, Rs Resistors
R2 Variable Resistor
A1, A2 Differential Amplifier Circuits
L Motor Coil

BEST MODE FOR CARRYING OUT THE INVENTION

Figure 1:
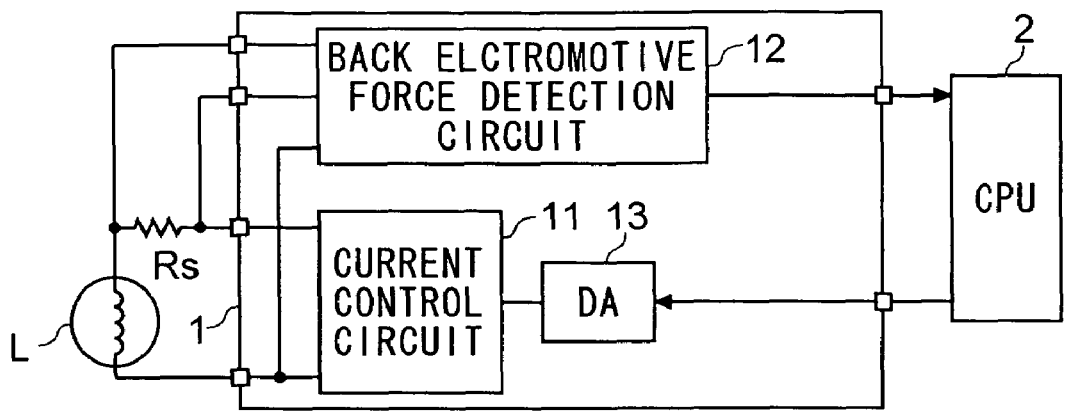
[FIG. 1] A block diagram showing the configuration of a motor driver according to the present invention.
Figure 2:
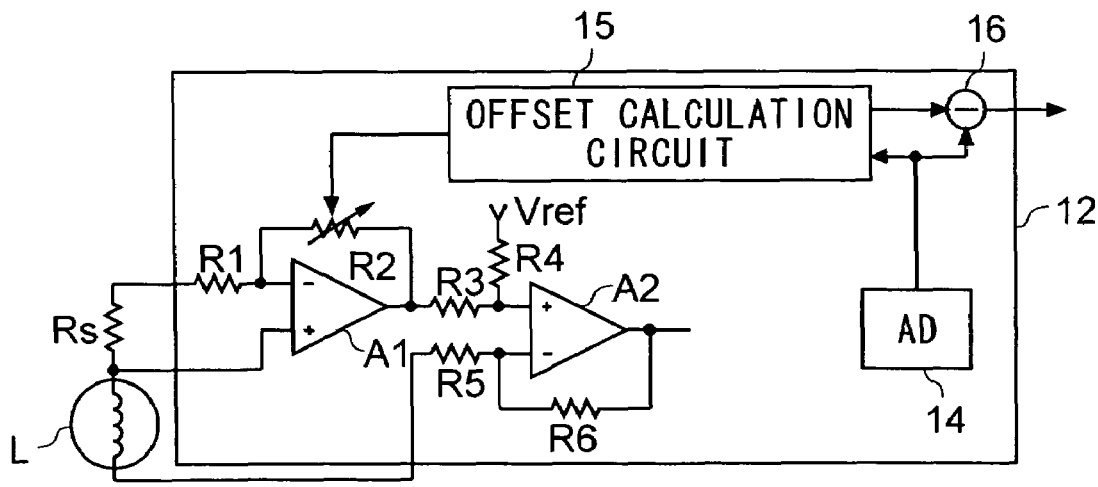
[FIG. 2] A circuit block diagram showing the internal configuration of the back electromotive force detection circuit provided in the motor driver shown in FIG. 1.

Hereinafter, an embodiment of the present invention will be described with reference to the drawings. FIG. 1 is a block diagram showing the internal configuration of a semiconductor integrated circuit device that constitutes a motor driver embodying the present invention. FIG. 2 is a circuit block diagram showing the internal configuration of a back electromotive force detection circuit formed within the semiconductor integrated circuit device that constitutes the motor driver shown in FIG. 1. In FIGS. 1 and 2, such parts and components as serve the same purposes as in FIG. 7 are identified with common reference numerals and symbols, and no detailed explanations thereof will be repeated.

The semiconductor integrated circuit device 1 that constitutes the motor driver shown in FIG. 1 includes: a current control circuit 11 that feeds a drive current to a motor coil L of a direct-current motor such as a VCM; a back electromotive force detection circuit 12 that receives the voltages at all different contacts of the motor coil L and a resistor Rs, which are connected in series, to detect the back electromotive force in the motor coil L; and a D/A conversion circuit 13 that performs D/A conversion on a current control signal, which is set by a CPU 2 according to a detection signal from the back electromotive force detection circuit 12 and which determines the current value of the drive current outputted from the current control circuit 11, and then feeds the resulting signal to the current control circuit 11.

In the motor driver built as the semiconductor integrated circuit device 1 described above, based on the voltages across the resistor Rs and the motor coil L, the back electromotive force detection circuit 12 detects the back electromotive force that appears in the motor coil L. When a detection signal representing the detected back electromotive force is fed from the back electromotive force detection circuit 12 to the CPU 2, which is a separate device from the semiconductor integrated circuit device 1, the CPU 2, based on the detection signal, produces a current control signal that determines the current value of the current to be fed to the motor coil L. When this current control signal is fed back to the semiconductor integrated circuit device 1, the D/A conversion circuit 13 converts it from a digital signal to an analog signal, and then feeds it to the current control circuit 11. Thus, the current control circuit 11 outputs a current, of which the current value is set based on the value represented by the current control signal, and feeds it to the motor coil L. Hence, the direct-current motor is driven and controlled via the motor coil L.

Figure 7:
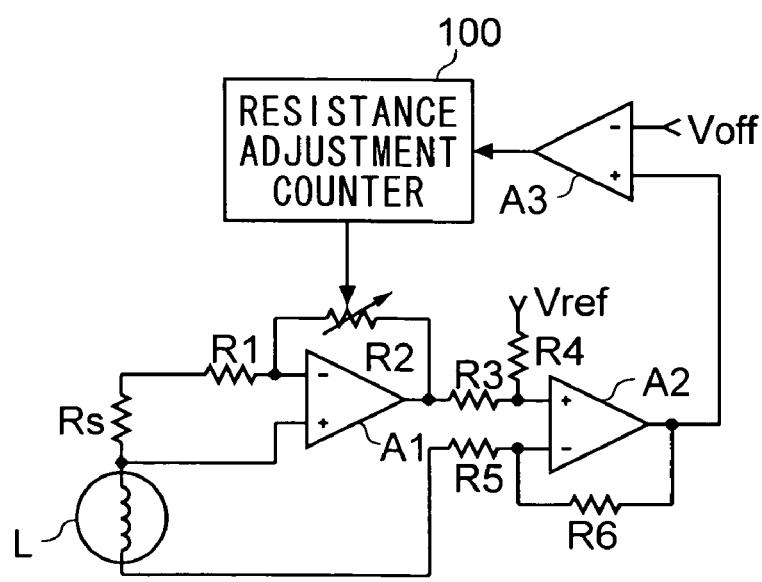
[FIG. 7] A circuit diagram showing the configuration of a conventional back electromotive force detection circuit.

As shown in FIG. 2, the back electromotive force detection circuit 12 includes, like the back electromotive force detection circuit shown in FIG. 7, resistors R1, R3 to R6, a variable resistor R2, and differential amplifier circuits A1 and A2, and further includes: an A/D conversion circuit 14 that performs A/D conversion on the output from the differential amplifier circuit A2; an offset calculation circuit 15 that performs calculation on the output from the A/D conversion circuit 14 to thereby calculate the offset of the differential amplifier circuit A2, and then sets the resistance value of the variable resistor R2; and a subtraction circuit 16 that subtracts from the output from the A/D conversion circuit 14 the offset stored in the offset calculation circuit 15. The digital signal outputted from the subtraction circuit 16 is outputted, as a detection signal, to the CPU 2.

In the back electromotive force detection circuit 12 configured as described above, let the resistance values of the resistors Rs and R1, the variable resistor R2, and the internal resistance of the motor coil L be Rs, R1, R2, and RL, respectively, let the current value of the drive current to the motor coil L be Io, and let the back electromotive force in the motor coil L be Vx, then the output value V of the differential amplifier circuit A2 is expressed by formula (1) below. In formula (1), the symbols A and B represent constants.

$$V = A \times (Io \times (RL - (R2/R1) \times Rs) + Vx + B) \quad (1)$$

Thus, by adjusting the resistance value of the variable resistor R2 so that $RL - (R2/R1) \times Rs = 0$, it is possible to eliminate from the detection signal expressed by formula (1) the element attributable to the current value Io of the drive current to the motor coil L, and thereby to make the output value V of the differential amplifier circuit A2 proportional to the back electromotive force. In a case where the output value V from the differential amplifier circuit A2 is in the range from zero to Vc, when the back electromotive force Vx in the motor coil L equals zero, the detection signal needs to be a digital signal of which the value corresponds to Vc/2. For that purpose, the output V from the differential amplifier circuit A2 contains, as an offset, the value $A \times B - Vc/2$.

Accordingly, a digital signal of which the value corresponds to that offset $A \times B - Vc/2$ is stored in the offset calculation circuit 15 and is fed to the subtraction circuit 16. This permits the subtraction circuit 16 to output a detection signal that represents the back electromotive force in the motor coil L and that contains no offset.

Even when the variable resistor R2 is adjusted as described above, as the temperature of the environment in which the motor driver is installed varies, the resistance value RL of the internal resistance of the motor coil L varies. Thus, when the resistance value of the internal resistance of the motor coil L changes from RL to RL±ΔRL, an offset of which the value equals $\pm \Delta V = \pm A \times \Delta RL \times Io$ appears in the detection signal outputted from the subtraction circuit 16. To cope with this, when the motor driver starts to drive, for the purpose of avoiding such an offset due to a change in temperature, the resistance value of the variable resistor R2 needs to be so changed as to eliminate, from the output of the differential amplifier circuit A2, an offset voltage corresponding to $\pm \Delta V = \pm A \times \Delta RL \times Io$.

How the offset that appears in the detection signal due to a change in temperature is eliminated will be described in detail below. To eliminate the above-mentioned offset ΔV, in a case where the resistance value of the variable resistor R2 changes from R2 to R2±ΔR2, the offset ΔV and the change in the resistance value of the variable resistor R2 need to fulfill the relationship expressed by formula (2) below. Suppose here that the output of the A/D conversion circuit 14 is an n-bit digital signal, the quantization unit Δv of the output value V of the A/D conversion circuit 14 equals $Vc/2^n$, and the outputted digital signal has a value in the range from zero to $2^{n-1}$. Moreover, when the output of the differential amplifier circuit A1 equals Vc/2, the value of the digital signal outputted from the A/D conversion circuit 14 equals $2^{n-}$. In this state, the offset ΔV that appears in the output value V of the A/D conversion circuit 14 due to a change in the internal resistance of the motor coil L is expressed by formula (3) below. Here, the symbol X represents an integer that fulfills $1 \leq X \leq 2^{n-1}$.

$$\Delta V = A \times Io \times (\Delta R2/R1) \times Rs \quad (2)$$

$$\Delta V = \Delta v \times X \quad (3)$$

Figure 3:
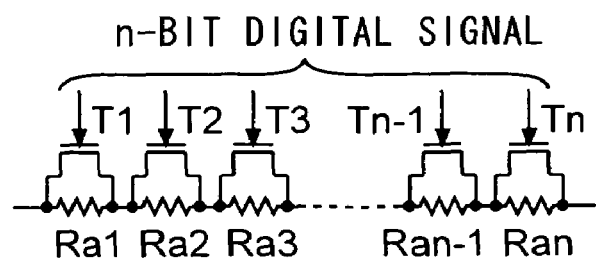
[FIG. 3] A circuit diagram showing the configuration of the variable resistor provided in the back electromotive force detection circuit.

Moreover, suppose that the variable resistor R2 changes in increments of Δr2, and that the change ΔR2 equals X×Δr2, then the relationship between Δr2 and Δv is expressed by formula (4) below. Thus, the resistance value of the variable resistor R2 is divided into n bits, with the quantization unit equal to Δr2. Here, as shown in FIG. 3, the variable resistor R2 is composed of: resistors Ra1, Ra2, ..., Ran−1, and Ran that are connected in series and that have resistance values $\Delta r2 \times 2^{n-1}, \Delta r2 \times 2^{n-2}, \ldots, \Delta r2 \times 2^1$, and $\Delta r2 \times 2^0$, respectively; and MOS transistors T1 to Tn that are connected in parallel with the resistors Ra1 to Ran, respectively. That is, the resistance value R2 of the variable resistor R2 can be varied within the range of $0 \leq R2 \leq \Delta r2 \times 2^{n-1}$.

$$\Delta v = A \times Io \times (\Delta r2/R1) \times Rs \quad (4)$$

Let the middle value of the resistance value of the variable resistor R2 be Rx ($= \Delta r2 \times 2^{n-1}$), then the resistance values of the resistors Ra1, Ra2, ..., Ran−1, and Ran equal $Rx/2^0$, $Rx/2^1, \ldots, Rx/2^{n-2}$, and $Rx/2^{n-1}$, respectively. The relationship between this resistance value Rx and the direct-current voltage Vc is expressed by formula (5) below. Thus, the current value Io may be constant, in which case the resistance value Rx equals $Vc \times R1/(2 \times A \times Io \times Rs)$, or alter natively the resistance value RX may be constant, in which case the current value Io equals Vc×R1/(2×A×Rx×Rs).

$$Vc = A \times Io \times (2Rx/R1) \times Rs \quad (5)$$

With the variable resistor R2 configured as described above, the resistance value of the variable resistor R2 is set by the offset calculation circuit 15 turning on and off the MOS transistors T1 to Tn. Specifically, when the MOS transistor Tk (where k represents an integer fulfilling $1 \leq k \leq n$) is turned on, the resistance value of the resistor Rak is not added to the resistance value of the variable resistor R2; when the MOS transistor Tk is turned off, the resistance value of the resistor Rak is added to the resistance value of the variable resistor R2.

Moreover, in the offset calculation circuit 15, first the output X1 from the A/D conversion circuit 14 as obtained when the drive current fed to the motor coil L equals zero is read, and is recorded as the offset to be subtracted in the subtraction circuit 16. Then, while the direct-current motor is kept at rest so that no back electromotive force appears in the motor coil L, the output X2 from the A/D conversion circuit 14 as obtained when a drive current having a predetermined value Io is fed to the motor coil L is read, and, from the output X2 of the A/D conversion circuit 14 as obtained when the drive current equals Io, the output X1 of the A/D conversion circuit as obtained when the drive current equals zero is subtracted. Then, based on the resulting value X2−X1, the MOS transistors T1 to Tn are turned on and off to set the resistance value of the variable resistor R2.

Figure 4A:
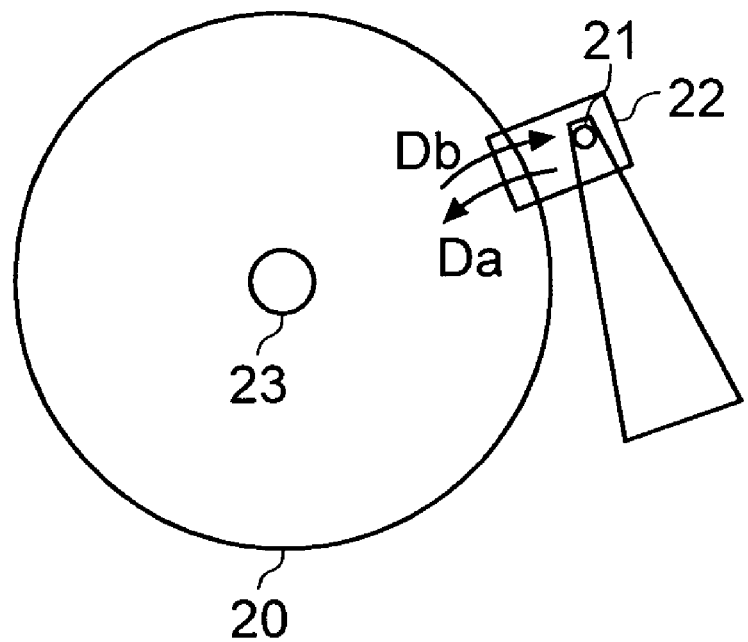
[FIG. 4A] A top view showing the construction of a hard disk drive in which a direct-current motor is driven by the motor driver shown in FIG. 1.
Figure 4B:
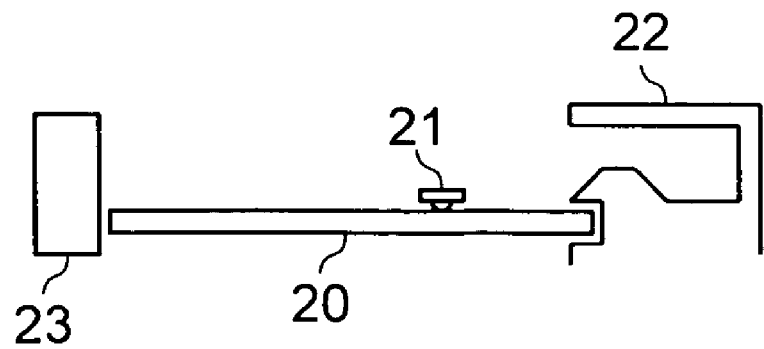
[FIG. 4B] A sectional view showing the construction of the hard disk drive in which the direct-current motor is driven by the motor driver shown in FIG. 1.

When the offset calculation circuit 15 operates as described above, for example in a case where the motor driver of this embodiment is used to drive and control a direct-current motor that produces a driving force for moving a magnetic head 21 across the surface of a disk 20 as shown in FIG. 4A, the offset is detected with the magnetic head 21 kept in contact with either an outer edge portion of the inner wall of a ramp area 22 that is provided outside the disk 20 to store the magnetic head 21 away in or a spindle 23 provided at the center of the disk 20. FIG. 4A is a view from above the top face of the disk 20, and FIG. 4B is a sectional view. In FIG. 4A, the arrow Da that represents the direction from the ramp area 22 to the spindle 23 indicates the direction in which the magnetic head 21 is loaded, and the arrow Db that represents the direction from the spindle 23 to the ramp area 22 indicates the direction in which the magnetic head 21 is unloaded.

Specifically, with the magnetic head 21 kept in contact with an outer edge portion of the inner wall of a ramp area 22, by feeding from the current control circuit 11 to the motor coil L a drive current flowing from the motor coil L to the resistor Rs so as to give a driving force that tends to move the magnetic head 21 in the direction indicated by the arrow Db, the resistance value of the variable resistor R2 is set. Moreover, with the magnetic head 21 kept in contact with the spindle 23, by feeding from the current control circuit 11 to the motor coil L a drive current flowing from the resistor Rs to the motor coil L so as to give a driving force that tends to move the magnetic head 21 in the direction indicated by the arrow Da, the resistance value of the variable resistor R2 is set. Furthermore, it is assumed that, when the drive current is passed in the direction from the resistor Rs to the motor coil L, its current value has a positive value.

Thus, when the magnetic head 21 is kept contact with the spindle 23, the drive current fed to the motor coil L has a positive value, and hence the offset that appears in the output from the A/D conversion circuit 14 equals X2−X1. Accordingly, the resistance value of the variable resistor R2 is set to be Rx−Δr2×(X2−X1). On the other hand, when the magnetic head 21 is kept contact with the ramp area 22, the drive current fed to the motor coil L has a negative value, and hence the offset that appears in the output from the A/D conversion circuit 14 equals −(X2−X1). Accordingly, the resistance value of the variable resistor R2 is set to be Rx−Δr2×(X1−X2).

The initial setting operation of the back electromotive force detection circuit 12 configured as described above will be described below with reference to the timing charts shown in FIGS. 5 and 6. Here, it is assumed that n=4, and thus that the A/D conversion circuit 14 perform conversion into a four-bit digital signal. Specifically, the variable resistor R2 is composed of resistors Ra1, Ra2, Ra3, and Ra4 having resistance values $Rx/2^0$, $Rx/2^1$, $Rx/2^2$, and $Rx/2^3$, respectively, and MOS transistors T1 to T4 connected in parallel with the resistors Ra1 to Ra4, respectively.

At the start of the initial setting operation, in response to a signal corresponding to $(2^4-1)_{10} = (1000)_2$, the MOS transistor T1, which receives at its gate a signal corresponding to "1" in the first digit from the offset calculation circuit 15 is turned off, and the MOS transistors T2 to T4, which receive at their gates signals corresponding to "0" in the second to fourth digits, are turned on. As a result, in the variable resistor R2, the Ra1 and the MOS transistors T2 to T4, which are turned on, are connected in series, and thus the variable resistor R2 has a resistance value $Rx/2^0$.

Figure 5:
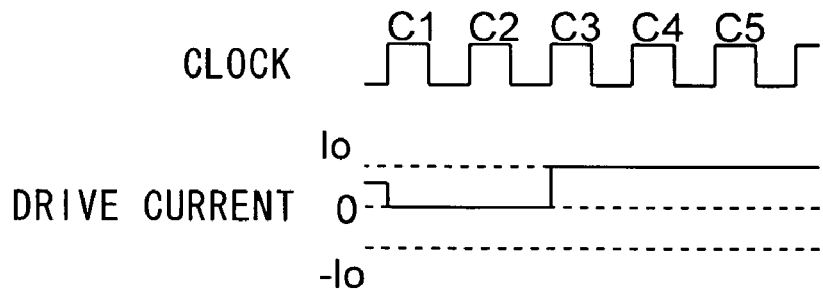
[FIG. 5] A timing chart showing the initial setting operation of the back electromotive force detection circuit.

Subsequently, when the offset is checked with the magnetic head 21 kept in contact with the spindle 23, as shown in FIG. 5, when the first internal clock pulse C1 is inputted to the back electromotive force detection circuit 12, the drive current fed to the motor coil L is made equal to zero. Then, when the second internal clock pulse C2 is inputted, the offset calculation circuit 15 reads the output X1 from the A/D conversion circuit 14, and stores $(X1-8)_{10}$ as the offset to be fed to the subtraction circuit 16.

Subsequently, as shown in FIG. 5, when the third internal clock pulse C3 is inputted, the current value of the drive current fed to the motor coil L is made equal to Io, which has a positive value. Thereafter, when the fourth internal clock pulse C4 is inputted, the output X2 from the A/D conversion circuit 14 is read to calculate $(8-(X2-X1))_{10}$, and a four-bit signal corresponding to $(8-)(X2-X1))_{10}$ is outputted to the variable resistor R2. Thus, with the four-bit signal corresponding to $(8-(X2-X1)_{10}$, the MOS transistors T1 to T4 are turned on or off, and the resistance value of the variable resistor R2 is set accordingly.

For example, suppose that the output X1 read when the internal clock pulse C2 is fed in is $(1001)_2$, and that the output X2 read when the internal clock pulse C4 is fed in is $(1011)_2$. In this case, when the internal clock pulse C2 is fed in, as the offset to be fed to the subtraction circuit 16, $(X1-8)_{10} = (1001)_2$ is stored in the offset calculation circuit 15.

Later, when the internal clock pulse C4 is fed in, $(8-(X2-X1))_{10} = (1000-(1011-10001))_2 = (0110)_2$ is calculated by the offset calculation circuit 15, and is fed to the variable resistor R2. Thus, the MOS transistors T2 and T3, which receive at their gates signals corresponding to "1" in the second and third digits, are turned off, and the MOS transistors T1 and T4, which receive at their gates signals corresponding to "0" in the first and fourth digits, are turned on. As a result, in the variable resistor R2, the resistors Ra2 and Ra3 and the MOS transistors T1 and T4, which are turned on, are connected in series, and thus the resistance value of the variable resistor R2 now equals $Rx/2^1 + Rx/2^2$.

Suppose now that the output X1 read when the internal clock pulse C2 is fed in is $(1001)_2$, and that the output X2 read when the internal clock pulse C4 is fed in is $(0111)_2$. In this case, when the internal clock pulse C2 is fed in, as the offset to be fed to the subtraction circuit 16, $(X1-8)_{10}=(0001)_2$ is stored in the offset calculation circuit 15.

Later, when the internal clock pulse C4 is fed in, $(8-(X2-X1))_{10}=(1000-(0111-1001))_2=(1010)_2$ is calculated by the offset calculation circuit 15, and is fed to the variable resistor R2. Thus, the MOS transistors T1 and T3, which receive at their gates signals corresponding to "1" in the first and third digits, are turned off, and the MOS transistors T2 and T4, which receive at their gates signals corresponding to "0" in the second and fourth digits, are turned on. As a result, in the variable resistor R2, the resistors Ra1 and Ra3 and the MOS transistors T2 and T4, which are turned on, are connected in series, and thus the resistance value of the variable resistor R2 now equals $Rx/2^0+Rx/2^2$.

Figure 6:
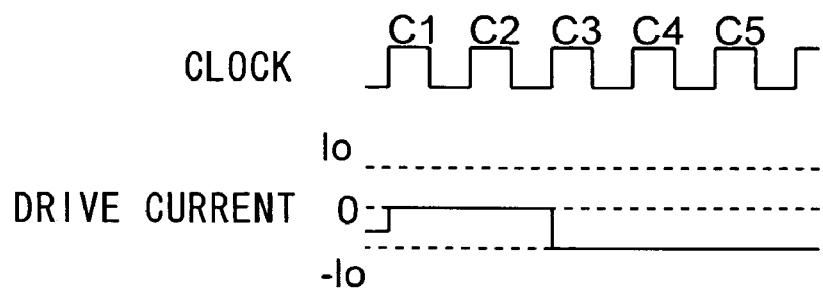
[FIG. 6] A timing chart showing the initial setting operation of the back electromotive force detection circuit.

On the other hand, when the offset is checked with the magnetic head 21 kept in contact with the ramp area 22, as shown in FIG. 6, when the first internal clock pulse C1 is inputted to the back electromotive force detection circuit 12, the drive current fed to the motor coil L is made equal to zero. Then, when the second internal clock pulse C2 is inputted, the offset calculation circuit 15 reads the output X1 from the A/D conversion circuit 14, and stores $(X1-8)_{10}$ as the offset to be fed to the subtraction circuit 16.

Subsequently, as shown in FIG. 6, when the third internal clock pulse C3 is inputted, the current value of the drive current fed to the motor coil L is made equal to-Io, which has a negative value. Thereafter, when the fourth internal clock pulse C4 is inputted, the output X2 from the A/D conversion circuit 14 is read to calculate $(8+(X2-X1))_{10}$, and a four-bit signal corresponding to $(8+(X2-X1))_{10}$, is outputted to the variable resistor R2. Thus, with the four-bit signal corresponding to $(8+(X2-X1))_{10}$, the MOS transistors T1 to T4 are turned on or off, and the resistance value of the variable resistor R2 is set accordingly.

For example, suppose that the output X1 read when the internal clock pulse C2 is fed in is $(1001)_2$, and that the output X2 read when the internal clock pulse C4 is fed in is $(1011)_2$. In this case, when the internal clock pulse C2 is fed in, as the offset to be fed to the subtraction circuit 16, $(X1-8)_{10}=(0001)_2$ is stored in the offset calculation circuit 15.

Later, when the internal clock pulse C4 is fed in, $(8+(X2-X1))_{10}=(1000+(1011-1001))_2=(1010)_2$ is calculated by the offset calculation circuit 15, and is fed to the variable resistor R2. Thus, the MOS transistors T1 and T3, which receive at their gates signals corresponding to "1" in the first and third digits, are turned off, and the MOS transistors T2 and T4, which receive at their gates signals corresponding to "0" in the second and fourth digits, are turned on. As a result, in the variable resistor R2, the resistors Ra1 and Ra3 and the MOS transistors T2 and T4, which are turned on, are connected in series, and thus the resistance value of the variable resistor R2 now equals $Rx/2^0+Rx/2^2$.

Suppose now that the output X1 read when the internal clock pulse C2 is fed in is $(1001)_2$, and that the output X2 read when the internal clock pulse C4 is fed in is $(0111)_2$. In this case, when the internal clock pulse C2 is fed in, as the offset to be fed to the subtraction circuit 16, $(X1-8)_{10}=(0001)_2$ is stored in the offset calculation circuit 15.

Later, when the internal clock pulse C4 is fed in, $(8+(X2-X1))_{10}=(1000+(0111-1001))_2, =(0110)_2$ is calculated by the offset calculation circuit 15, and is fed to the variable resistor R2. Thus, the MOS transistors T2 and T3, which receive at their gates signals corresponding to "1" in the second and third digits, are turned off, and the MOS transistors T1 and T4, which receive at their gates signals corresponding to "0" in the first and fourth digits, are turned on. As a result, in the variable resistor R2, the resistors Ra2 and Ra3 and the MOS transistors T1 and T4, which are turned on, are connected in series, and thus the resistance value of the variable resistor R2 now equals $Rx/2^1+Rx/2^2$.

Through operations as performed in the different examples described above, the value obtained by eliminating from the output of the differential amplifier circuit A2 the offset due to the internal resistance of the motor coil L is outputted from the A/D conversion circuit 14. Thus, when the internal clock pulse CS is fed in with the current value of the drive current to the motor coil L kept equal to Jo, which has a positive value, the output from the A/D conversion circuit 14 equals $(1001)_2$. Then, the subtraction circuit 16 subtracts the offset $(0001)_2$, and thus the detection signal outputted from the subtraction circuit 16 has a value $(1000)_2$.

What is claimed is:

1. A motor driver comprising:
   a back electromotive force detection section that detects a back electromotive force appearing in a motor coil of a direct-current motor and outputs a detection signal; and
   a speed control section that, based on the back electromotive force detected by the back electromotive force detection section, sets and outputs a current value of a drive current fed to the motor coil,
   wherein the motor driver further comprises:
   an offset calculation section
      that first establishes a state in which the direct-current motor cannot be driven via the motor coil and thus no back electromotive force appears,
      that then reads, as a first output, an output of the back electromotive force detection section as obtained when the current value of the drive current fed to the motor coil is made equal to zero,
      that then reads, as a second output, the output of the back electromotive force detection section as obtained when the current value of the drive current fed to the motor coil is made equal to a predetermined value,
      that then calculates, based on a difference between the first and second outputs, an offset that appears in the output of the back electromotive force detection section as a result of a change in an internal resistance of the motor coil, and
      that then eliminates the offset by changing an amplification factor of the back electromotive force detection section.

2. The motor driver of claim 1,
   wherein the back electromotive force detection section comprises:
   a detection resistor of which one end is connected to one end of the motor coil;
   a first resistor of which one end is connected to another end of the detection resistor;
   a second resistor of which one end is connected to another end of the first resistor;
   a first differential amplifier circuit
      of which one input terminal is connected to a node between the first and second resistors, of which an output terminal is connected to another end of the second resistor, and of which another input terminal is connected to a node between the motor coil and the detection resistor; and a second differential amplifier circuit of which one input terminal is connected to an output from the first differential amplifier circuit, and of which another input terminal is connected to another end of the motor coil, wherein the offset that appears in the output of the back electromotive force detection section as the result of the change in the internal resistance of the motor coil is eliminated by the offset calculation section varying the second resistor by a resistance value proportional to the difference between the first and second outputs.

3. The motor driver of claim 2, wherein the back electromotive force detection section further comprises:

an analog/digital conversion circuit that performs analog/digital conversion so that an output, in a range from zero to Vc, from the second differential amplifier circuit is converted into an n-bit digital signal, and wherein, let an initial value of a resistance value of the second resistor be Rx, let the first output outputted from the analog/digital conversion circuit be X1, and let the second output outputted from the analog/digital conversion circuit be X2, then, when the predetermined value to which the drive current is made equal to is positive, a resistance value of the second resistor is set to be $Rx \times (1-(X2-X1)/2^{n-1})$, and, when the predetermined value to which the drive current is made equal to is negative, the resistance value of the second resistor is set to be $Rx \times (1+(X2-X1)/2^{n-1})$.

4. The motor driver of claim 3, wherein the second resistor is composed of n resistors connected in series and having resistance values of $Rx/2^0$, $Rx/2^1$, $Rx/2^2$, ..., $Rx/2^{n-2}$, and $Rx/2^{n-1}$, respectively, and n switches connected in parallel with the n resistors, respectively, and wherein the offset calculation section outputs an n-bit digital signal, of which a k-th bit as counted from a highest bit is used to turn on and off, in the second resistor, the switch connected parallel with the resistor having a resistance value of $Rx/2^{k-1}$, and, when the predetermined value to which the drive current is made equal to is positive, the offset calculation section outputs an n-bit digital signal corresponding to $2^{n-1}-(X2-X1)$ to the n switches of the second resistor, and, when the predetermined value to which the drive current is made equal to is negative, the offset calculation section outputs an n-bit digital signal corresponding to $2^{n-1}+(X2-X1)$ to the n switches of the second resistor.

5. The motor driver of claim 3, wherein let an absolute value of the predetermined value to which the drive current is made equal to be Io, let a resistance value of the detection resistor be Rs, let a resistance value of the first resistor be R1, and let an amplification factor of the second differential amplifier circuit be A, then a relationship $$Vc = A \times Io \times Rs \times (2Rx)/R1$$

is fulfilled.

6. The motor driver of claim 4, wherein the second resistor is composed of n resistors connected in series and having resistance values of $Rx/2^0$, $Rx/2^1$, $Rx/2^2$, ..., $Rx/2^{n-2}$, and $Rx/2^{n-1}$, respectively, and n switches connected in parallel with the n resistors, respectively, and wherein the offset calculation section outputs an n-bit digital signal, of which a k-th bit signal as counted from a highest bit is used to turn on and off, in the second resistor, the switch connected parallel with the resistor having a resistance value of $Rx/2^{k-1}$, and, when the predetermined value to which the drive current is made equal to is positive, the offset calculation section outputs an n-bit digital signal corresponding to $2^{n-1}-(X2-X1)$ to the n switches of the second resistor, and, when the predetermined value to which the drive current is made equal to is negative, the offset calculation section outputs an n-bit digital signal corresponding to $2^{n-1}+(X2-X1)$ to the n switches of the second resistor.

7. The motor driver of claim 1, wherein the motor driver further comprises a subtraction section that eliminates the offset appearing when no back electromotive force appears, and wherein a difference between a third output outputted from the back electromotive force detection section when no back electromotive force appears and the first output is stored, in the offset calculation section, as the offset appearing when no back electromotive force appears, and a value obtained by subtracting from the output of the back electromotive force detection section the difference between the third and first outputs as stored in the offset calculation section is outputted as the detection signal.

8. The motor driver of claim 1, wherein the back electromotive force detection section and the speed control section are built into a single semiconductor integrated circuit device.

9. The motor driver of claim 7, wherein the detection signal from the back electromotive force detection section is outputted to an external control circuit, and a value calculated by the control circuit based on the detection signal is inputted to the speed control section.

10. A magnetic disk apparatus comprising:

the motor driver of one of claims 1 to 9;

the direct-current motor driven and controlled by the motor driver;

a magnetic head that moves in a direction of a radius of the magnetic disk by being fed with a driving force of the direct-current motor;

a spindle with a center of which the magnetic disk is engaged; and a ramp area that is provided outside the magnetic disk and in which the magnetic head is stored away, wherein, when the magnetic head is kept in contact with the spindle or an inner wall of the ramp area, an offset that appears in the output of the back electromotive force detection section as the result of the change in the internal resistance of the motor coil of the direct-current motor is calculated by the offset calculation section, and the offset is eliminated by changing the amplification factor of the back electromotive force detection section.

* * * * *